US009805366B1

(12) United States Patent
Wilson et al.

(10) Patent No.: US 9,805,366 B1
(45) Date of Patent: Oct. 31, 2017

(54) ASSOCIATING PAYMENT INFORMATION FROM A PAYMENT TRANSACTION WITH A USER ACCOUNT

(71) Applicant: Square, Inc., San Francisco, CA (US)

(72) Inventors: Matthew Wilson, San Francisco, CA (US); William Henderson, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/027,706

(22) Filed: Sep. 16, 2013

(51) Int. Cl.
G06Q 20/40 (2012.01)
G06Q 20/38 (2012.01)

(52) U.S. Cl.
CPC .................. G06Q 20/382 (2013.01)

(58) Field of Classification Search
CPC ...................................... G06Q 20/40
USPC .......................................... 705/44
See application file for complete search history.

(56) References Cited

U.S. PATENT DOCUMENTS

| 2,666,655 | A | 1/1954 | Wolowitz |
| 2,811,796 | A | 11/1957 | Schoelles |
| 3,606,138 | A | 9/1971 | Allison |
| D271,985 | S | 12/1983 | Belser |
| 5,467,917 | A | 11/1995 | Potter |
| 5,629,977 | A | 5/1997 | Fonseca |
| D396,055 | S | 7/1998 | Ritchey |
| D504,159 | S | 4/2005 | Best et al. |
| D512,456 | S | 12/2005 | Diaz et al. |
| D531,187 | S | 10/2006 | Gusmorino et al. |
| 7,222,797 | B2 | 5/2007 | Davilla et al. |
| D550,248 | S | 9/2007 | Jewitt et al. |
| D569,902 | S | 5/2008 | Chang et al. |
| D575,332 | S | 8/2008 | Parker et al. |
| D582,931 | S | 12/2008 | Blankenship et al. |
| 7,490,720 | B2 | 2/2009 | Cole et al. |

(Continued)

FOREIGN PATENT DOCUMENTS

WO    WO 2012051072    4/2012

OTHER PUBLICATIONS

Goode, Lauren. *Paying With Square's New Mobile-Payments App*. All Things D. Published Apr. 30, 2012. Retrieved on Nov. 7, 2014. Retrieved from the Internet: URL<http://allthingsd.com/20120430/paying-with-squares-new-mobile-payments-app/>. 3 pages.

(Continued)

*Primary Examiner* — Lindsay M Maguire
(74) *Attorney, Agent, or Firm* — Polsinelli PC

(57) ABSTRACT

Methods, systems, and apparatus, including computer programs encoded on computer storage media, for associating payment information from a payment transaction with a user account. One of the methods includes receiving an indication of a payment transaction between a customer and a merchant, wherein the payment transaction is associated with payment information. A customer parameter that identifies an account with the payment service system is received. If the customer has consented to associate the payment information with the account of the payment service system based on receiving the customer parameter that identifies the account with the payment service system, the account is identified based on the received customer parameter, and the payment information is associated with the identified account of the payment service system.

20 Claims, 6 Drawing Sheets

(56) References Cited

U.S. PATENT DOCUMENTS

| | | | |
|---|---|---|---|
| 7,523,858 | B2 | 4/2009 | Moulton et al. |
| D593,118 | S | 5/2009 | Nathan et al. |
| D612,862 | S | 3/2010 | Fletcher et al. |
| D613,300 | S | 4/2010 | Chaudhri |
| D622,763 | S | 8/2010 | Lamm et al. |
| D624,927 | S | 10/2010 | Allen et al. |
| D624,934 | S | 10/2010 | Umezawa |
| D638,439 | S | 5/2011 | Cavanaugh et al. |
| D640,284 | S | 6/2011 | Woo et al. |
| 7,975,927 | B1 | 7/2011 | Whitney |
| 8,002,197 | B1 | 8/2011 | Whitaker |
| D645,876 | S | 9/2011 | Cavanaugh et al. |
| 8,027,881 | B2 | 9/2011 | Granich |
| D647,915 | S | 11/2011 | Urdan et al. |
| 8,127,999 | B2 | 3/2012 | Diamond |
| 8,132,668 | B2 | 3/2012 | Davis |
| D685,842 | S | 7/2013 | Glass et al. |
| D695,314 | S | 12/2013 | Jang et al. |
| D703,230 | S | 4/2014 | Abratowski et al. |
| D704,735 | S | 5/2014 | Hollobaugh et al. |
| D706,816 | S | 6/2014 | Holz et al. |
| D734,388 | S | 7/2015 | Lin et al. |
| 2002/0062281 | A1 | 5/2002 | Singhal |
| 2002/0100797 | A1 | 8/2002 | Hollingsworth et al. |
| 2002/0120582 | A1* | 8/2002 | Elston et al. ............... 705/64 |
| 2003/0126094 | A1 | 7/2003 | Fisher et al. |
| 2003/0206169 | A1 | 11/2003 | Springer et al. |
| 2004/0049420 | A1 | 3/2004 | Carlson et al. |
| 2004/0140361 | A1 | 7/2004 | Paul et al. |
| 2004/0230610 | A1 | 11/2004 | Gutierrez-Sheris |
| 2005/0249389 | A1 | 11/2005 | Knowles |
| 2006/0085513 | A1 | 4/2006 | Malik |
| 2006/0168150 | A1 | 7/2006 | Naik et al. |
| 2007/0017973 | A1 | 1/2007 | Blank et al. |
| 2007/0080196 | A1 | 4/2007 | Rosenkranz et al. |
| 2007/0084907 | A1 | 4/2007 | Kranz |
| 2008/0103905 | A1 | 5/2008 | Nixon-Lane |
| 2008/0123828 | A1 | 5/2008 | Mayer |
| 2008/0163257 | A1 | 7/2008 | Carlson et al. |
| 2008/0167027 | A1* | 7/2008 | Gautier et al. ............. 455/419 |
| 2008/0177604 | A1 | 7/2008 | Shaw et al. |
| 2009/0165343 | A1 | 7/2009 | Miller et al. |
| 2009/0266724 | A1 | 10/2009 | Norman |
| 2009/0313138 | A1* | 12/2009 | Ratnakar ..................... 705/27 |
| 2010/0019030 | A1 | 1/2010 | Monk |
| 2010/0089990 | A1 | 4/2010 | Spaulding |
| 2010/0138344 | A1 | 6/2010 | Wong et al. |
| 2010/0314442 | A1 | 12/2010 | Hildred |
| 2011/0125607 | A1 | 5/2011 | Wilen |
| 2011/0155799 | A1 | 6/2011 | Meszaros et al. |
| 2011/0238517 | A1* | 9/2011 | Ramalingam et al. ...... 705/26.1 |
| 2011/0291945 | A1 | 12/2011 | Ewing, Jr. et al. |
| 2012/0022924 | A1 | 1/2012 | Runnels et al. |
| 2012/0066043 | A1 | 3/2012 | Carmichael et al. |
| 2012/0095907 | A1 | 4/2012 | Dorsey et al. |
| 2012/0101944 | A1 | 4/2012 | Lin et al. |
| 2012/0109787 | A1 | 5/2012 | Larrick et al. |
| 2012/0118949 | A1 | 5/2012 | Diamond |
| 2012/0185317 | A1 | 7/2012 | Wong |
| 2012/0197773 | A1 | 8/2012 | Grigg et al. |
| 2012/0234911 | A1 | 9/2012 | Yankovich et al. |
| 2012/0290368 | A1 | 11/2012 | Im |
| 2013/0046686 | A1 | 2/2013 | Ress et al. |
| 2013/0132274 | A1 | 5/2013 | Henderson et al. |
| 2013/0346911 | A1 | 12/2013 | Sripada |
| 2014/0058873 | A1 | 2/2014 | Sorensen et al. |
| 2014/0074581 | A1 | 3/2014 | Johnson et al. |
| 2014/0157186 | A1 | 6/2014 | Bhat et al. |
| 2014/0183265 | A1 | 7/2014 | Barnings et al. |
| 2014/0195419 | A1 | 7/2014 | Sim et al. |
| 2014/0203088 | A1 | 7/2014 | Eng |

OTHER PUBLICATIONS

Non-Final Office Action dated Jun. 27, 2014, for Design U.S. Appl. No. 29/437,478, of Lin, A., et al., filed Nov. 16, 2012.
Restriction Requirement dated Jul. 29, 2014, for U.S. Appl. No. 13/943,617, of of Henderson, W., filed Jul. 16, 2013.
Non-Final Office Action dated Aug. 18, 2014, for Design U.S. Appl. No. 29/437,474, of Andersen, R., et al., filed Nov. 16, 2012.
Non-Final Office Action dated Aug. 18, 2014, for Design U.S. Appl. No. 29/437,475, of Andersen, R., filed Nov. 16, 2012.
Non-Final Office Action dated Nov. 20, 2014, for U.S. Appl. No. 13/943,617, of Henderson, W., filed Jul. 16, 2013.
Final Office Action dated Dec. 11, 2014, for Design U.S. Appl. No. 29/437,474, of Andersen, R., et al., filed Nov. 16, 2012.
Notice of Allowance dated Mar. 13, 2015, for Design U.S. Appl. No. 29/437,478, of Lin, A., et al., filed Nov. 16, 2012.

* cited by examiner

US 9,805,366 B1

ASSOCIATING PAYMENT INFORMATION FROM A PAYMENT TRANSACTION WITH A USER ACCOUNT

TECHNICAL FIELD

This disclosure relates to storing payment information during a transaction.

BACKGROUND

In a conventional electronic credit card transaction at an online store between a customer and an online merchant, the transaction is authorized and captured over a network connection. In the authorization stage, credit card information is entered into an interface of the online store, e.g., a payment form. A payment request is sent electronically from a computing device running the online store to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the online store. In the capture stage, the approved transaction is again routed from the online store to the credit card processor, card network and card issuer. The capture stage can trigger the financial transaction between the card issuer and the merchant, and optionally creates a receipt. There can also be other entities, e.g., the card acquirer, in the route of the transaction. Debit card transactions have a different routing, but also require entry of card information.

Generally, the online store can store payment information that is manually entered at the payment form with the customer's consent. For example, the online store can save the payment information in a secure database. The online store can pre-fill the payment information in the payment form during the next time the customer wants to purchase from the online store.

SUMMARY

A payment service system can associate payment information with a customer account after processing a payment card during a conventional transaction, e.g., a credit card swipe, with a merchant. The payment service system can create a new customer account from a single swipe of a payment card after receiving an adequate indication of customer consent to create an account. The payment service system can also seamlessly associate payment information obtained from a payment card with an existing customer account.

Advantages may include one or more of the following. A customer need not manually or separately provide payment information in order to associate payment information with an account of a payment service system. Instead, the payment information, e.g., a card number, can be obtained from a conventional transaction, e.g., a card swipe, between the customer and a merchant. This creates a convenient and seamless experience for new customers who want to create accounts with a payment service system.

BRIEF DESCRIPTION OF THE DRAWINGS

Like reference numbers and designations in the various drawings indicate like elements.

DETAILED DESCRIPTION

Customers can associate payment information from a conventional payment card transaction with an account of a payment service system, which can allow the customers to conduct cardless payment transactions in the future. A cardless payment transaction is a transaction between a customer and a merchant at a point of sale that is conducted without physically presenting a payment card to the merchant at the point of sale. Rather, customer's account with the payment service system is linked to a financial account, e.g., a credit card account, or other payment methods such as debit cards, pre-paid cards, bank accounts, or other third-party financial accounts. During a cardless payment transaction, the merchant need not receive any details about the financial account of the customer, e.g., the credit card issuer, credit card number, in order to process a payment transaction.

Figure 1:
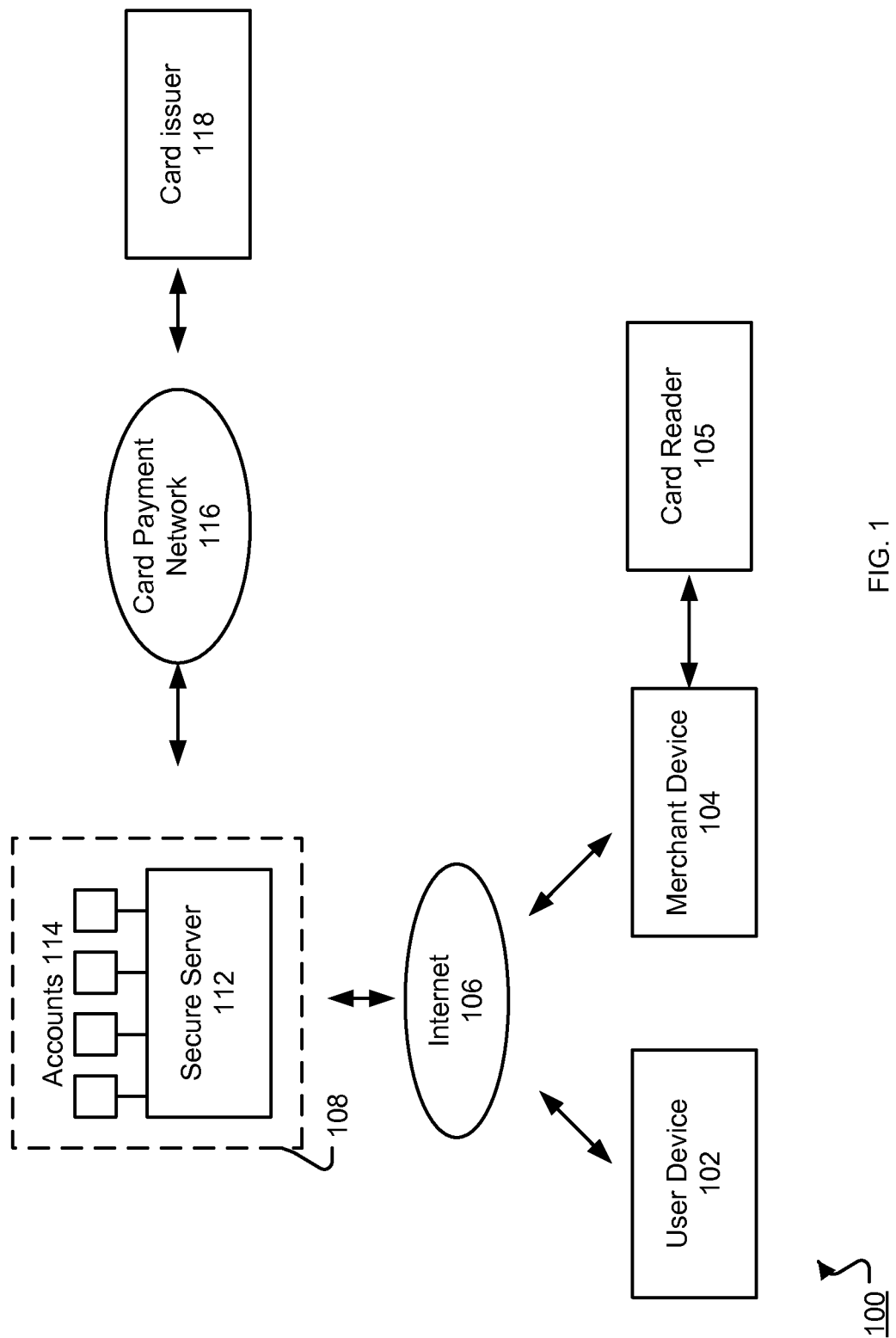
FIG. 1 is a schematic illustration of an example cardless payment system architecture.

FIG. 1 is a schematic illustration of the architecture of an example cardless payment system 100. The overall system 100 includes a user device 102 and merchant device 104 connected to a network, e.g., the Internet 106. The user device 102 is a mobile computing device, i.e., a hand-held computing device, capable of running a user application. For example, the user device 102 can be a smartphone or tablet computer. The merchant device 104 is also a computing device, capable of running a merchant application. The merchant device 104 can be a mobile device, or it can be a desktop computer, a laptop computer, a dedicated point of sale system, or other data processing apparatus.

The merchant device 104 can communicate with a card reader 105. For example, the card reader 105 can be coupled to the merchant device 104 through an audio jack of the merchant device 104 or can wirelessly communicate with the merchant device 104. The card reader 105 can be used to obtain payment information, e.g., a card number, from a customer during a transaction with the merchant device 104. For example, a user can swipe a payment card at the card reader 105, and the merchant device 104 can receive data obtained from the payment card and send the data to a payment service system 108.

A cardless payment processor operates the payment service system 108. The user and merchant devices can communicate with the payment service system 108 using the network 106. The payment service system 108 includes one or more servers 112, at least some of which can handle secure transactions (e.g., a secure server), to processes all transactions between the user device 102 and merchant device 104. In general, servers 112 can store public merchant information such as the merchant's address or phone number. The servers 112 can also be responsible for transferring or updating the user application to the user's mobile device or transferring or updating the merchant application to the merchant's computing device. In particular, the servers 112 can be responsible for sending information about merchants that have accounts with the cardless payment system to the user device 102. The servers 112 also handle and store secure information such as credit card numbers, debit card numbers, bank accounts, user accounts, user identifying information or other sensitive information.

The payment service system 108 can communicate electronically with a card payment network 116, e.g., Visa, Mastercard, or the like. The payment service system 108 can communicate with a computer system 116 of a card payment network, e.g., Visa or MasterCard. The payment service system 108 can communicate with a computer system 116 over the same network 106 used to communicate with the user device 102, or over a different network. The computer system 116 of the card payment network can communicate in turn with a computer system of a card issuer 118, e.g., a bank. There can also be computer systems of other entities, e.g., the card acquirer, between the payment service system 108 and the card issuer.

As will be explained in more detail below, a user can create an account with the payment service system 108 upon conducting a conventional transaction with a merchant. A user may also create an account with the payment service system 108 before conducting a transaction with a merchant, and the user can then automatically associate payment information with the account upon conducting a conventional transaction with a merchant. A user can create an account using a dedicated mobile application or by visiting a website using a web browser installed on a mobile device 102 or another computing device, e.g., a home computer. The merchant can sign up for an account with the payment service system 108 using the merchant device 104 or another device. The merchant enters a name, account password, and contact information, e.g., email address, and physical location information, e.g., an address, into the payment service system 108. The merchant can also provide other information, e.g., a list of goods or services available, operating hours, phone number, a small identifying image logo or mark, to the payment service system 108. The data associated with the merchant account 114 can be stored at the servers 112, e.g., in a database.

At some point prior to the transaction, a merchant application is downloaded to the merchant device 102, e.g., through an application store. Creation of the merchant account can be handled through the merchant application, or through another application, e.g., a generic web browser.

Eventually, in order to receive funds from the transaction, the merchant will need to enter financial account information into the payment service system sufficient to receive funds. For example, in the case of a bank account, the user can enter the bank account number and routing number. However, the merchant's financial account can also be associated with a credit card account or another third party financial account. In addition, in some implementations, if the merchant has not entered the financial account information, the cardless payment processor can hold the received funds until the financial account information is provided.

Figure 2:
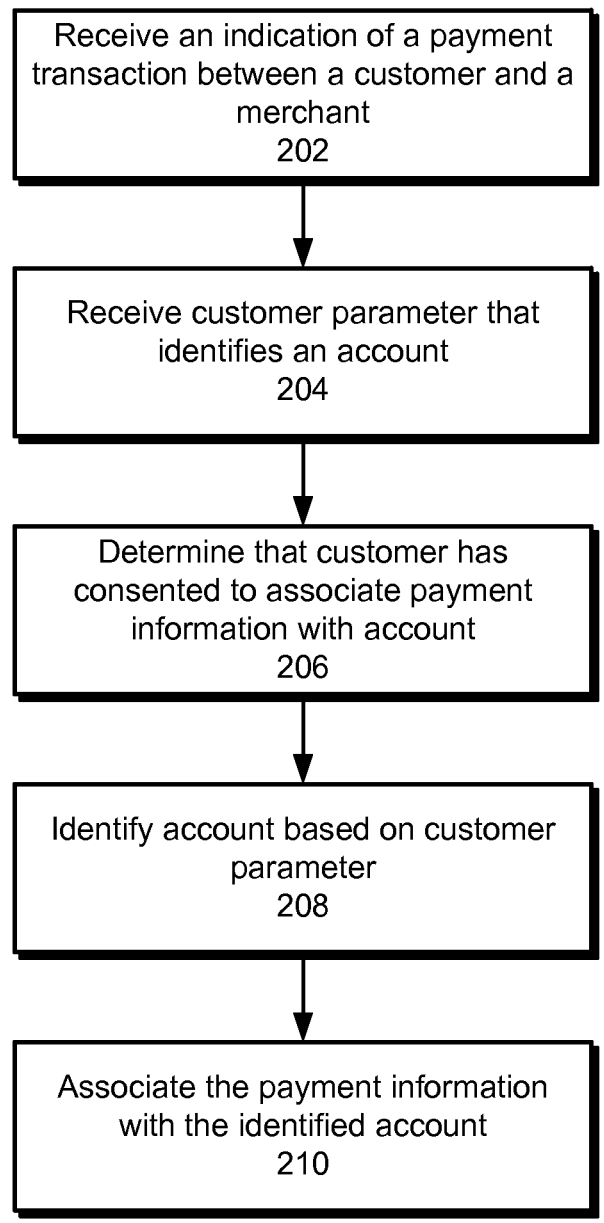
FIG. 2 is a diagram of an example process for associating payment information with a user account.

FIG. 2 is a diagram of an example process for associating payment information with a user account. In general, a payment service system receives payment information entered during a conventional payment transaction and a customer parameter that identifies a customer. If the customer consents to associating the payment information with an existing account with the payment service system, the payment service system can associate the received payment information with the customer account. The customer can thereafter conduct cardless payment transactions using payment information associated with the customer account. The example process can be performed by an appropriately programmed system of one or more computers, e.g. the payment service system 108 in FIG. 1.

The system receives an indication of a payment transaction between a customer and a merchant (202). The payment transaction can be a conventional payment transaction of a customer using a payment card having a magnetic strip or an embedded chip at the merchant's place of business. For example, a customer can enter a coffee shop and pay for a cup of coffee by swiping a credit card.

The system can receive the indication of the payment transaction due to the merchant processing the payment transaction using a merchant application of the payment service system installed on a merchant device. The merchant device transmits the data acquired from the swipe of the card, e.g., the card number, expiration date, to the payment service system.

The system receives a customer parameter that identifies an account (204). The merchant application installed on the merchant device can prompt the customer to enter a customer parameter that can be used to identify a preexisting account with the payment service system. For example, the customer may have previously created an account with the payment service system and may not have manually associated payment information, e.g. a payment card number, with the account.

The customer can thus provide a customer parameter that can be used to identify the preexisting customer account, e.g., a phone number, an email address, a username of the payment service system, a username of a messaging, blogging, or another service, or other contact information for the customer.

Figure 3:
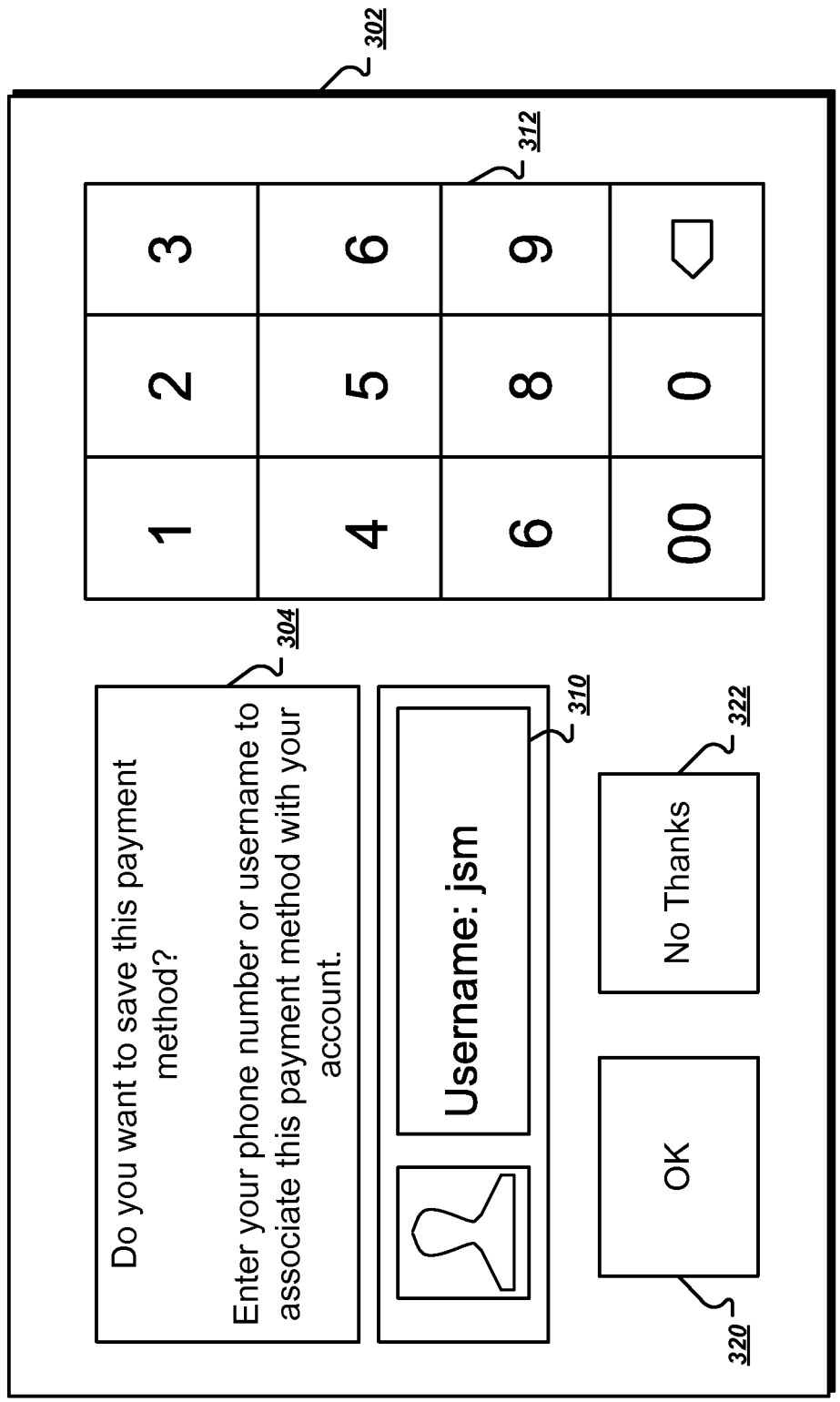
FIG. 3 is a diagram of an example user interface of a merchant application installed on a merchant device.

FIG. 3 is a diagram of an example user interface 302 of a merchant application installed on a merchant device. A customer can interact with the user interface 302, e.g., by touching a presence-sensitive display or by using a keyboard or other input mechanism, to provide a customer parameter that identifies the customer account.

The user interface 302 includes instructions 304 asking whether the customer wants to save the method of payment used during the purchase transaction and indicating how to enter the customer parameter. The user interface 302 includes a input field 310 for entering a username associated with the account. The user interface 302 also includes a keypad 312 for entering a phone number associated with the account. The user can submit the provided customer parameter by selecting an "OK" button 320, or the user can decline to save the payment information by selecting the "No Thanks" button 322.

Referring back to the example process of FIG. 2, the system determines that the customer has consented to associate the payment information with the account (206). The payment service system will generally associate the payment information with the customer account only upon receiving an adequate indication of consent from the customer to do so. The merchant device can provide a presentation of information to the customer that entering the customer parameter will result in associating the provided payment information with the customer account. Thus, in some implementations, the system may consider the receipt of the customer parameter at the merchant device to be adequate customer consent.

In some other implementations, the system requires further information before determining that the customer has consented. For example, the system may also check that the customer is physically proximate to the merchant's place of business, e.g., as determined by geolocation of the customer's mobile device using an appropriate geolocation technology, e.g., global positioning system (GPS) signals, Bluetooth Low Energy (BLE), near-field communication (NFC), to name just a few examples. Thus, the system may decline to associate payment information with the customer account if the customer is more than a threshold distance from the merchant's place of business.

The system may additionally require that the user explicitly check in with the merchant to determine that the customer has consented. A customer can install a user application on a mobile device that can be used to find nearby merchants that conduct cardless payment transactions and that allows the user to "check in" with merchants to conduct cardless payment transactions.

Figure 4:
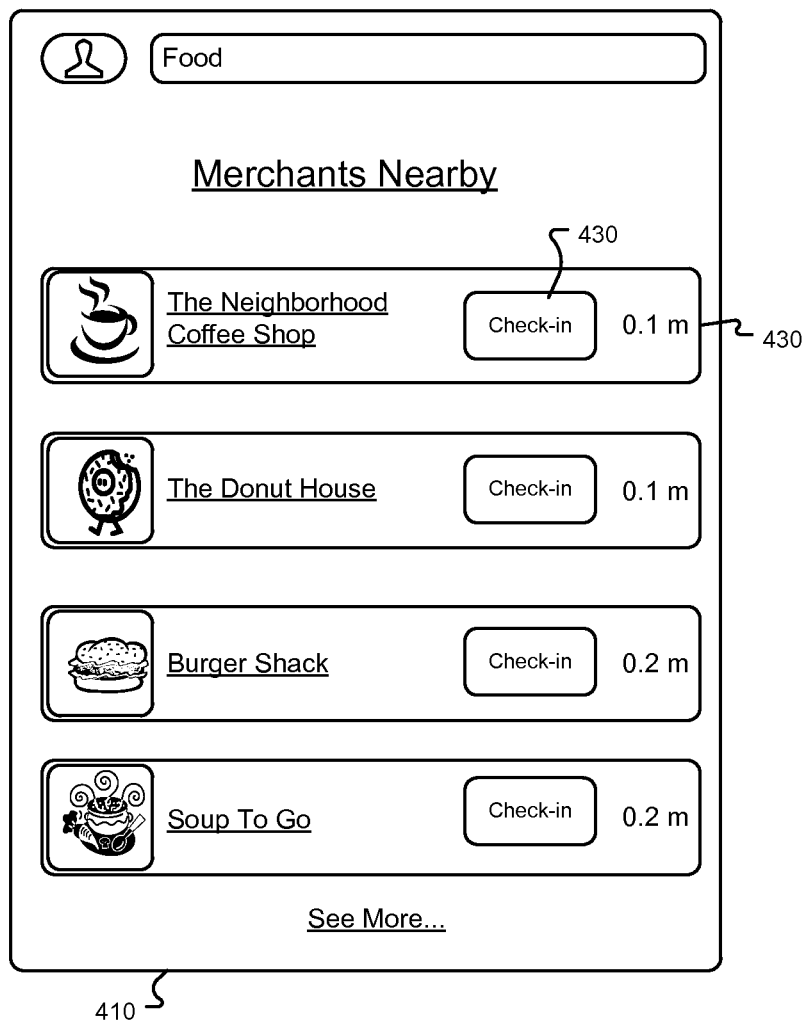
FIG. 4 is a diagram of an example user interface of a user application installed on a mobile user device.

FIG. 4 is a diagram of an example user interface 410 of a user application installed on a mobile user device. A customer can indicate consent to conduct a cardless payment transaction by "checking in" with a merchant using the interface 410. The interface 410 lists merchant information for merchants nearby. Each item of merchant information, e.g., item 430, includes the name of the merchant, a merchant icon, and an indication of how far the merchant's place of business is from the current location of the mobile user device. Each item of merchant information also includes a button 430 that the user can invoke to explicitly "check in" with the merchant. The user can also configure the application to automatically "check in" with the merchant once the user is within a particular geolocation radius of the merchant. Thus, the system may also use checking in as an additional layer of customer consent to associate the payment information from the payment transaction with the user's account.

Referring back to FIG. 2, the system identifies the account based on the customer parameter (208). The system uses the customer parameter received at the merchant device to identify the preexisting customer account. If the customer account cannot be located based on the customer parameter, the system may notify the customer by providing an error message at the merchant device or by using the provided customer parameter. For example, if the customer parameter is a phone number, the system can send a text message using the phone number to inform the customer that the association of payment information with the customer's account has failed.

The system associates the payment information with the identified account (210). For example, the system can store information about the payment card used to conduct the payment transaction.

Thereafter, the customer can use the account to conduct cardless payment transactions, which may be processed using the payment information obtained from the purchase transaction. For example, some time later the payment service system may receive a request for a second payment transaction that specifies only a customer parameter. The system may use the customer parameter to identify the customer's account, and the system can use the payment information associated with the customer's account to process the second payment transaction. Thus, the customer was able to associate payment information with an account of the payment service system without the need to manually or separately enter the payment information through a user application or a web browser interface.

Figure 5:
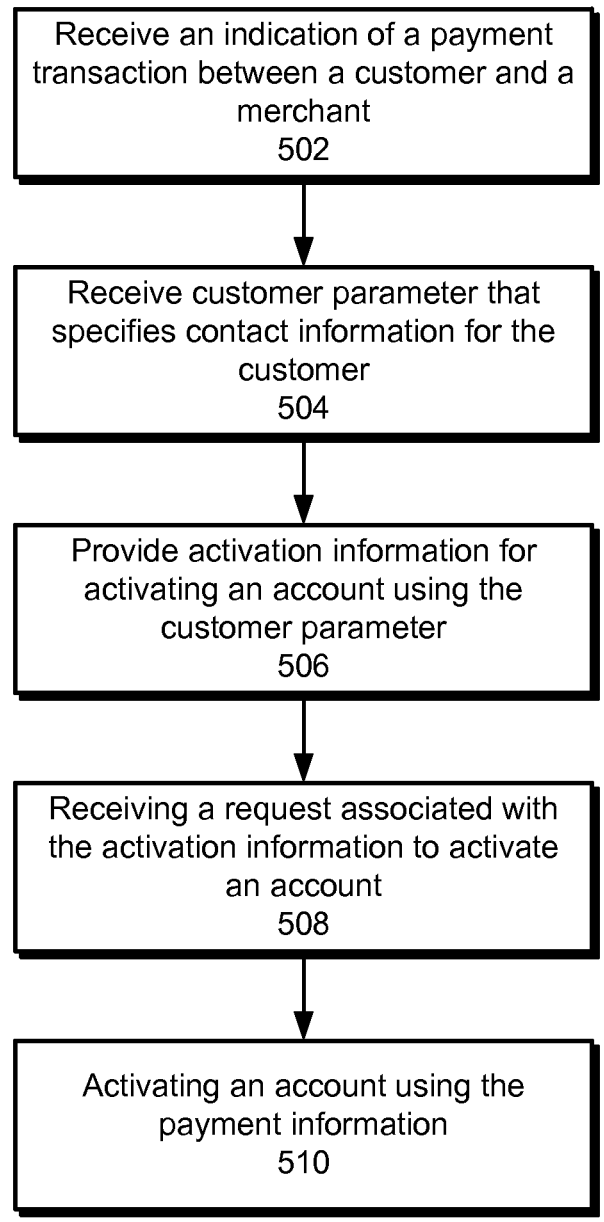
FIG. 5 is a diagram of an example process for creating an account using payment information from a purchase transaction.

FIG. 5 is a diagram of an example process for creating an account using payment information from a purchase transaction. In general, a payment service system receives payment information entered during a conventional payment transaction and a customer parameter that identifies a customer. If the customer consents to creating a new account with the payment service system, the payment service system can provide activation information to the customer. The customer can use the activation information to request creation of the account, and the payment service system can create the account with the payment information accordingly. The customer can thereafter conduct cardless payment transactions using payment information associated with the customer account. The example process can be performed by an appropriately programmed system of one or more computers, e.g. the payment service system 108 in FIG. 1.

The system receives an indication of a payment transaction between a customer and a merchant (502). The payment transaction can be a conventional payment transaction of a customer using a payment card having a magnetic strip or an embedded chip at the merchant's place of business.

The system receives a customer parameter that specifies contact information for the customer (504). The merchant application installed on the merchant device can prompt the customer to enter a customer parameter that can be used to contact the customer in order to verify that the customer consents to creating an account. The customer parameter can be a phone number, an email address, a username of a messaging or blogging service, or other contact information for the customer.

Figure 6:
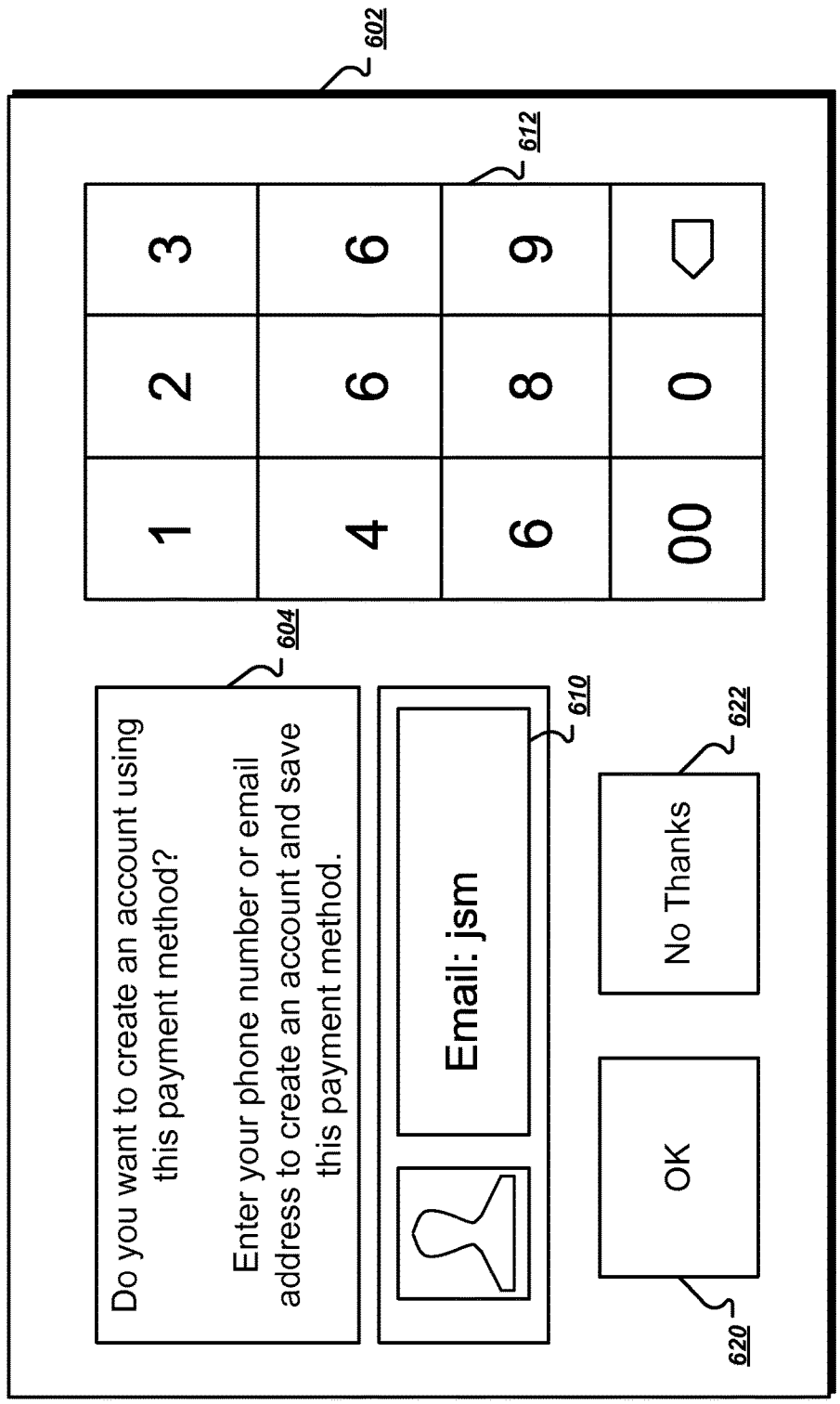
FIG. 6 is a diagram of an example user interface of a merchant application installed on a merchant device.

FIG. 6 is a diagram of an example user interface 602 of a merchant application installed on a merchant device. A customer can interact with the user interface 602, e.g., by touching a presence-sensitive display or by using a keyboard or other input mechanism, to provide a customer parameter that specifies contact information for the customer.

The user interface 602 includes instructions 604 asking whether the customer wants to create an account using the method of payment used during the purchase transaction and indicating how to enter the customer parameter. The user interface 602 includes a input field 610 for entering an email address or another user identifier of the customer. The user interface 602 also includes a keypad 612 for entering a phone number of the user. The user can submit the provided customer parameter by selecting an "OK" button 620, or the user can decline to create an account using the payment information by selecting the "No Thanks" button 622.

The system provides activation information for activating an account using the customer parameter (506). The payment service system uses the contact information specified by the customer parameter to communicate with the customer through an appropriate channel. For example, if the customer provided a customer parameter that specifies a phone number of a mobile device, the system can send the customer a text message, e.g., an SMS message, that includes the activation information. Similarly, if the customer provided an email address, the system can send an email message to the customer that includes the activation information.

The activation information allows the customer to request creation of an account with the payment service system. The activation information may also include instructions that describe that an account will be created by using the activation information as indicated. For example, the activation information can be a network location, e.g., a Uniform Resource Locator, that the customer can select or enter into a web browser to request creation of the account. The activation information may also be instructions to send a text message or an email message to a particular recipient and may specify particular information that the message should include to activate the account.

For example, a text message or email message sent to the customer can instruct the customer to send a reply with the text "activate" or "yes." The activation information can also request that the reply provide further information that can be used to verify the identity of the customer. For example, the activation information can request that the customer provide the last four digits of the payment card used during the purchase transaction, the card verification value (CVV), or a postal code associated with a billing address of the payment card.

The system receives a request associated with the activation information to activate an account (508). The payment service system can receive the request according to the appropriate channel specified by the activation information. For example, the system can receive, at a web server, an HTTP request that includes information, e.g., a query string, that can be used to identify the customer and the payment information obtained from the transaction between the customer and the merchant. Similarly, the system can receive the request in the form of a text message and can identify the customer using a number associated with the text message or from other information in the body of the text message.

The system activates an account using the payment information (510). The system will generally create the account only after determining an adequate level of consent from the customer to create an account. In some implementations, the system considers the explicit request received from the customer using the provided activation information to be an adequate level of consent from the customer. The system may additionally prompt the user to confirm that the customer consents to creating an account. As described above with reference to FIG. 3, the system may additionally require that the customer be physically proximate to the merchant before creating the account. If the activation information requested additional information, e.g., the last four digits of the payment card, the system can first verify that the information provided by the customer matches information associated with the payment card before creating an account.

The system then creates the account using the payment information obtained from the transaction between the customer and merchant. The system can match the payment information to the customer request using the provided customer parameter or some other identifier assigned by the system. The system may then prompt the user to enter additional information to be associated with the account, e.g., a profile picture, a full name, an address, or other information.

After creating the account, the customer can thereafter use the account to conduct cardless payment transactions, which may be processed using the payment information obtained from the purchase transaction. The customer can also conduct subsequent cardless payment transaction using other information that the customer provided after the account was created, e.g., a username.

Thus, the customer was able to create an account with the payment service system by providing only a customer parameter that specifies contact information and by confirming the account creation using the provided activation information. The customer was able to create an account without the need to manually or separately enter the payment information through a user application or a web browser interface.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, by a payment service system, from a merchant point of sale (POS) device associated with a merchant, payment information associated with a payment transaction between a customer and the merchant, wherein the payment information is read by a card reader;
   processing, by the payment service system, the payment transaction between the customer and the merchant using the payment information;

receiving, by the payment service system, from the merchant POS device, a customer parameter that specifies contact information for the customer;

receiving, by the payment service system, from a customer device associated with the customer, an indication that a geolocation associated with the customer device is within a threshold distance of the merchant, wherein the geolocation associated with the customer device is generated by a global positioning system (GPS) unit of the customer device;

providing, by the payment service system, to the customer device using the customer parameter, activation information for the customer to activate an account with the payment service system with the payment information;

receiving by the payment service system, from the customer device, a request associated with the activation information to activate the account with the payment service system;

based at least in part on the indication of the geolocation and the request associated with the activation information, creating the account with the payment service system by:
  identifying, using the request associated with the activation information, the payment information that was received from the merchant POS device and associated with the payment transaction;
  associating the payment information with the account;
  storing, based at least in part on associating the payment information with the account, account information with the account, the account information including at least the payment information along with at least one of the customer parameter or a name of the customer; and
  activating the account with the payment service system, wherein the account information allows the customer to perform cardless payment transactions with one or more merchants using at least one of the customer parameter or the name of the customer;

after activating the account, receiving, by the payment service system, a request to process a cardless payment transaction for the customer, the request including the at least one of the customer parameter or the name of the customer;

identifying, by the payment service system, the account of the customer using the at least one of the customer parameter or the name of the customer;

determining, by the payment service system, that the customer has consented to the cardless payment transaction; and processing, by the payment service system, the cardless payment transaction using the payment information that is stored in association with the account.

2. The method of claim 1, wherein the customer parameter is a phone number associated with the customer device, and wherein providing the activation information to the customer device comprises providing an electronic message that includes an activation link to the customer device associated with the phone number.

3. The method of claim 1, wherein the customer parameter is an email address, and wherein providing the activation information to the customer device comprises providing an email message that includes an activation link to the email address.

4. The method of claim 1, further comprising:
providing account update information to the customer device for adding additional information to the account;
receiving a second customer parameter from the customer; and
associating the second customer parameter with the account.

5. The method of claim 1, further comprising:
receiving, from the customer device, at least a portion of the payment information along with the request associated with the activation information; and
verifying that the portion of the payment information received from the customer device matches the payment information received from the merchant POS device,
and wherein activating the account with the payment service system is further based, at least in part, on verifying that the portion of the payment information received from the customer device matches the payment information received from the merchant POS device.

6. The method of claim 1, wherein the customer parameter includes contact information associated with the customer.

7. The method of claim 1, wherein determining that the customer has consented to the cardless payment transaction comprises determining that the customer has checked in with a merchant associated with the cardless payment transaction based, at least in part, on the geolocation associated with the customer device.

8. A payment service system comprising:
one or more processors; and
one or more memory devices storing instructions executable by the one or more processors, wherein the instructions program the one or more processors to:
  receive, from a merchant device using a card reader, payment information associate with a payment transaction between a customer and a merchant;
  receive, from a customer device associated with the customer, an indication that a geolocation associated with the customer device is within a threshold distance of the merchant, wherein the geolocation associated with the customer device is generated by a global positioning system (GPS) unit of the customer device;
  receive a customer parameter that identifies the customer;
  provide, using the customer parameter, activation information for the customer to activate an account with the payment service system with the payment information;
  receive a request associated with the activation information to activate the account with the payment service system;
  based at least in part on the indication of the geolocation and the request associated with the activation information, creating the account with the payment service system by:
    identifying, using the request associated with the activation information, the payment information that was received from the merchant device and associated with the payment transaction;
    associating the payment information with the account;
    storing, based at least in part on associating the payment information with the account, account information with the account, the account information including at least the payment information along with the customer parameter; and activating the account, wherein the account allows the customer to perform cardless payment transactions with one or more merchants using the customer parameter;

receive a request to process a cardless transaction for the customer, the request including the customer parameter;

identify the account of the customer using the customer parameter;

determine that the customer has consented to the cardless payment transaction; and process the cardless payment transaction using the payment information that is stored in association with the account.

9. The payment service system of claim 8, wherein the customer parameter is a phone number associated with the customer device, and wherein providing the activation information comprises providing an electronic message that includes an activation link to the customer device associated with the phone number.

10. The payment service system of claim 8, wherein the customer parameter is an email address associated with the customer, and wherein providing the activation information comprises providing an email message that includes an activation link to the email address.

11. The payment service system of claim 8, wherein the instructions further program the one or more processors to:
provide account update information to the customer device for adding additional information to the account;
receive a second customer parameter from the customer device; and
associate the second customer parameter with the account.

12. The payment service system of claim 8, wherein the instructions further program the one or more processors to:
receive, from the customer device, at least a portion of the payment information along with the request associated with the activation information; and
verify that the portion of the payment information received from the customer device matches the payment information received from the merchant device, and wherein activating the account with the payment service system is further based, at least in part, on verifying that the portion of the payment information received from the customer device matches the payment information received from the merchant device.

13. The payment service system of claim 8, wherein determining that the customer has consented to the cardless payment transaction comprises determining that the customer has checked in with a merchant associated with the cardless payment transaction based, at least in part, on the geolocation associated with the customer device.

14. The payment service system of claim 8, wherein the customer parameter includes contact information associated with the customer.

15. One or more computer storage medium devices executing instructions that, when executed on one or more processors, cause the one or more processors to perform the acts comprising:
receiving, from a merchant device, payment information associated with a payment transaction between a customer and a merchant;
receiving, from a customer device associated with the customer, an indication that a geolocation associated with the customer device is within a threshold distance of the merchant, wherein the geolocation associated with the customer device is generated by a global positioning system (GPS) unit of the customer device;
receiving a customer parameter that identifies the customer;
providing, using the customer parameter, activation information for the customer to activate an account with a payment service system with the payment information;
receiving a request associated with the activation information to activate the account with the payment service system;
based at least in part on the indication of the geolocation and the request associated with the activation information, creating the account with the payment service system by:
identifying, using the request associated with the activation information, the payment information that was received from the merchant POS device and associated with the payment transaction;
associating the payment information with the account;
storing, based at least in part on associating the payment information with the account, account information with the account, the account information including at least the payment information and the customer parameter; and
activating the account with the payment service system, wherein the account allows the customer to perform cardless payment transactions with one or more merchants using the customer parameter;
receiving a request to process a cardless transaction for the customer, the request including the customer parameter;
identifying the account of the customer using the customer parameter;
processing the cardless payment transaction using the payment information that is stored in association with the account.

16. The one or more computer storage medium devices of claim 15, wherein the customer parameter is a phone number associated with the customer device, and wherein providing the activation information comprises providing an electronic message that includes an activation link to the customer device associated with the phone number.

17. The one or more computer storage medium devices of claim 15, wherein the customer parameter is an email address associated with the customer, and wherein providing the activation information comprises providing an email message that includes an activation link to the email address.

18. The one or more computer storage medium devices of claim 15, the acts further comprising:
providing account update information to the customer for adding additional information to the account;
receiving a second customer parameter from the customer; and
associating the second customer parameter with the account.

19. The one or more computer storage medium devices of claim 15, the acts further comprising:
receiving, from the customer device, at least a portion of the payment information along with the request associated with the activation information; and
verifying that the portion of the payment information received from the customer device matches the payment information received from the merchant device, and wherein activating the account with the payment service system is further based, at least in part, on verifying that the portion of the payment information received from the customer device matches the payment information received from the merchant device.

20. The one or more computer storage medium devices of claim 15, wherein, before processing the cardless payment transaction, the acts further comprising determining that the customer has checked in with a merchant associated with the cardless payment transaction based, at least in part, on the geolocation associated with the customer device.

* * * * *